Patented Feb. 7, 1928.

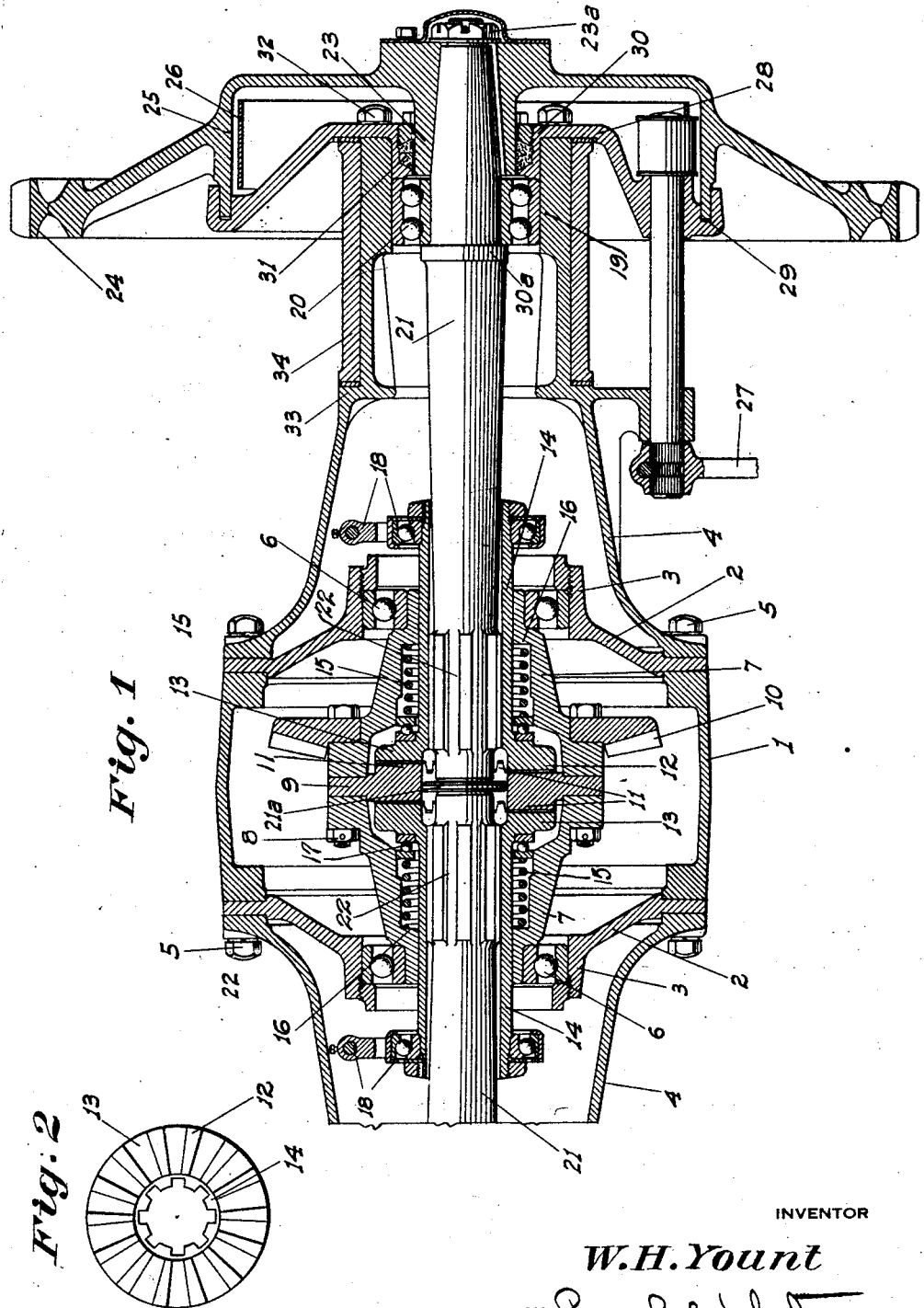

1,658,276

UNITED STATES PATENT OFFICE.

WILLIS H. YOUNT, OF STOCKTON, CALIFORNIA, ASSIGNOR, BY MESNE ASSIGNMENTS, TO MONARCH FOUNDRY COMPANY, OF STOCKTON, CALIFORNIA, A CORPORATION.

TRACTOR DRIVE MECHANISM.

Application filed June 10, 1926. Serial No. 114,919.

This invention relates to improvements in tractors of the endless track type in which the propelling power is imparted to the tracks by main drive sprocket wheels engaging the tracks; and in which steering of the tractor is effected by alternately clutching or declutching one sprocket or the other from the common drive means which is driven directly from the engine of the tractor.

Ordinarily friction clutches are used for this purpose which must be large to avoid the possibility of slippage and which require so much room transversely that the parts are crowded and a complicated and more or less inaccessible assembly results.

The principal object of my invention is to provide a driving structure for this purpose having clutch means of a simple, compact and positive driving nature and which allows the driven clutch members to be mounted directly on the main sprocket wheel shafts. This also provides sufficient space on the shaft housing between the clutch structure and the sprocket wheels to serve as a pivotal support for one end of the necessary idler-roller supporting frame, thus eliminating numerous parts necessary with the present form of construction and providing a very rigid and substantial arrangement with a minimum of weight.

The structure as a whole is also arranged so as to enable the dismantling of the various parts to be very easily accomplished without necessitating that all parts be disassembled from each other to get at any one part, as will be seen hereinafter.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a sectional elevation of the drive mechanism taken from one of the sprocket wheels to a point a certain distance beyond the clutch mechanism for the other sprocket wheel.

Fig. 2 is an end view of a sliding clutch sleeve member detached.

Referring now more particularly to the characters of reference on the drawings, the numeral 1 denotes a preferably cylindrical housing located centrally of the width of the tractor. From the periphery of this housing flange members 2 project inwardly, being formed with sleeves 3 concentric with the axis of the housing. Separate housings 4 project in opposite directions from the housing 1 outwardly of the flanges 2, each housing 4 and the adjacent flange 2 being secured in common to the housing 1 by bolts 5.

The sleeves 3 form supports for bearings 6 which in turn support sleeve members 7 which project thence towards each other and are secured in common by bolts 8 to a ring 9 centrally located in the housing 1. One of said sleeves has in addition the usual bevel ring gear 10 secured thereby by said bolts 8, which gear is driven by the pinion on the propeller shaft (not shown) as is customary. The sleeves 7, ring 9 and gear 10 therefore forms a rigid turnable unit supported at its opposite ends by the bearings 6.

The ring 9 inwardly of its connection with the sleeves 7 is provided on both sides with radial clutch teeth 11. These teeth are engaged by similar teeth 12 formed on the adjacent end flanges 13 of sleeve members 14 which are slidable and turnable in the corresponding sleeves 7 and project outwardly therebeyond.

Compression springs 15 enclosed by the sleeves 7 are disposed about the sleeves 14, said springs bearing at one end against shoulders 16 formed with the sleeves 7 toward their outer ends, and at the other ends bearing against thrust bearings 17 which are disposed between said springs and the corresponding flanges 13.

The teeth on these members have a slight diverging angle toward their roots so as to enable the cooperating teeth to slide smoothly into engagement with each other. At the same time this angle is not sufficient to impart any appreciable tendency for the teeth to climb out from engagement with each other, and relatively light and short springs 15 therefore suffice to hold the clutches from slipping.

At their outer ends the sleeves 14 are provided with individual shirting yoke structures 18 of suitable character.

The housings 4 project a considerable distance beyond the yokes 18 and terminate at their outer ends in sleeves 19 concentric with the sleeves 14, which sleeves 19 form supports for ball or similar bearings 20. These bearings support independent shafts 21 which are alined with each other in the housing. At one end inwardly of the bearings 20 the shafts have removable splined engagement with the sleeves 14, as shown at 22, said shafts terminating adjacent each other with a thrust washer 21ª therebetween. At the other end outwardly of the bearings 20 the shafts are taper-fitted onto the hubs 23 of the main track sprocket wheels 24 and are held against removal by nuts 23ª on the shafts on the outer ends of the hubs. Each wheel is formed with an integral internal brake drum 25 having a brake band 26 to frictionally engage the same. Each band is independently actuated as is usual by a suitable mechanism controlled by a lever 27 mounted on the outside of the housing 4. Each drum is enclosed and protected from dust, oil and the like by a flange member 28 which adjacent its outer periphery has an annular groove 29 in which the adjacent end of the drum turnably projects. At its inner end said flange has a hub sleeve 30 which projects into the sleeve 19 to bear against the adjacent end of the bearing 20. An oil absorbing packing ring 31 of felt or the like is seated in said hub 30 to bear against the hub 23.

The flange 28 is removably but rigidly secured to the sleeve 19 by bolts 32 whose heads are disposed in the brake drum enclosure. The outer face of the sprocket wheel between the brake drum and hub is of course solid to prevent dirt and the like getting at the drum from outside the sprocket wheel.

For some distance inwardly from the outer end of the housing 4 the latter is cylindrical, said cylindrical portion terminating at its inner end in an outwardly projecting shoulder 33.

Turnably mounted on said cylindrical portion is a sleeve 34 formed on the rear end of the usual idler-roller frame, this sleeve extending from the shoulder 33 to the outer end of the housing 4, at which point the flange 28 acts as a stop preventing lateral movement and removal of said sleeve 34. This sleeve can be of ample width to form a substantial bearing and without increasing the track gage of the tractor by reason of the very compact clutch arrangement which I employ.

The shaft 21 is held against similar outward displacement because the bearing 20 (which is fixed onto the shaft) is held against such movement between the hub 30 and a flange or shoulder 30ª on said shaft.

In operation both clutch sleeves are normally engaged with the centrally master clutch member which is constantly driven and therefore both shafts 21 turn together at the same speed. Upon actuating either shifting yoke the corresponding clutch sleeve is disengaged from the master clutch and the corresponding shaft 21 is therefore disengaged from driving relation with the power plant. The tractor will therefore steer in one direction or the other in the usual manner.

If it is desired to remove either sprocket wheel alone, for the replacement of the brake band or similar purpose, it is only necessary to remove the nut 23ª. If the sleeve 34 is to be removed, the wheel is removed to expose the bolts 32 which when removed allows the flange 28 to be withdrawn, which enables the sleeve 34 to be withdrawn also.

If it is desired to inspect or remove any part of the clutch assembly, either housing 4, together with the sprocket wheel, shaft 21 and associated parts as a unit, may be detached from the housing 1 by removing the bolts 5. This exposes the adjacent flange 2 and allows this member to be withdrawn if desired. When this is done the clutch structure may be taken apart by removing the bolts 8.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A driving mechanism for a tractor including a housing, independent and alined shafts turnably mounted therein, drive members on the outer ends of the shafts, a driven ring disposed in the housing centrally thereof, opposed sleeves concentric with but spaced from the shaft secured at their adjacent ends to the opposite faces of the ring, bearing and locating means for said sleeves in the housing, clutch teeth on the opposed faces of the ring inwardly of the sleeves, independent shiftable members splined on the adjacent ends of the shafts, and clutch teeth to cooperate with the ring teeth provided with said shiftable members.

2. A driving mechanism for a tractor including a housing, independent and alined shafts turnably mounted therein, drive members on the outer ends of the shafts, a driven ring disposed in the housing centrally thereof, opposed sleeves concentric with but spaced from the shaft secured at their adjacent ends to the opposite faces of the ring, bearing and locating means for said sleeves in the housing, clutch teeth on the opposed faces of the ring inwardly of the sleeves, sleeves splined on the adjacent ends of the shafts and projecting outwardly of the first named sleeves, clutch teeth to cooperate with the ring teeth provided in connection with the splined sleeves at their inner ends, and means for shifting the splined sleeves applied to the outer ends of the same.

3. A driving mechanism for an endless track tractor including a housing structure, track engaging sprockets at the outer ends of the housing, drive means for said wheels mounted within the housing, frame-sleeves turnably mounted on the housing adjacent the outer ends thereof, and removable from such ends by an outward lateral movement, internal brake drums on the sprocket wheels projecting inwardly thereof, and flange members mounted on the outer ends of the housing and projecting outwardly past the frame sleeves to the drums to both enclose the drums and prevent outward displacement of the frame sleeves.

In testimony whereof I affix my signature.

WILLIS H. YOUNT.